(12) United States Patent
Thubert et al.

(10) Patent No.: US 9,628,435 B2
(45) Date of Patent: Apr. 18, 2017

(54) DUPLICATE ADDRESS DETECTION BASED ON DISTRIBUTED BLOOM FILTER

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 14/516,707

(22) Filed: Oct. 17, 2014

(65) Prior Publication Data

US 2016/0112367 A1 Apr. 21, 2016

(51) Int. Cl.
*H04L 12/28* (2006.01)
*H04L 29/12* (2006.01)
*H04L 12/18* (2006.01)
*H04L 12/741* (2013.01)

(52) U.S. Cl.
CPC ............ *H04L 61/10* (2013.01); *H04L 12/185* (2013.01); *H04L 12/1886* (2013.01); *H04L 45/745* (2013.01); *H04L 61/2092* (2013.01); *H04L 61/2046* (2013.01); *H04L 61/6059* (2013.01)

(58) Field of Classification Search
CPC . H04L 47/7453; H04L 47/323; H04L 47/125; H04L 29/12283; H04L 47/10; H04L 47/60; H04L 47/18; H04L 43/10; H04L 45/00; H04L 29/0653; H04L 29/06; H04L 2012/563
See application file for complete search history.

(56) References Cited

U.S. PATENT DOCUMENTS

| | | | |
|---|---|---|---|
| 7,995,595 B1 | 8/2011 | Mogul | |
| 8,065,515 B2 | 11/2011 | Droms et al. | |
| 2005/0018668 A1* | 1/2005 | Cheriton | ............... H04L 47/10 370/389 |
| 2006/0165003 A1* | 7/2006 | Partridge | ............... H04L 43/10 370/248 |

(Continued)

FOREIGN PATENT DOCUMENTS

EP 1655928 A1 5/2006

OTHER PUBLICATIONS

Crainiceanu, "Bloofi: A Hierarchical Bloom Filter Index with Applications to Distributed Data Provence", [online], Cloud-I '13, Riva del Garda, Trento, Italy, Aug. 26, 2013, [retrieved on Jul. 10, 2014]. Retrieved from the Internet: <URL: http://www.usna.edu/Users/cs/adina/research/Bloofi%20_Cloud12013.pdf>, 8 pages.

(Continued)

*Primary Examiner* — Andrew Lee
(74) *Attorney, Agent, or Firm* — Leon R. Turkevich

(57) ABSTRACT

In one embodiment, a method comprises: generating, by a first network device in a network, a Bloom filter bit vector representing device addresses of devices having attached to at least one of the first network device or a second network device in the network; and determining whether a new device address is not a duplicate of any of the device addresses in the network based on the Bloom filter bit vector.

21 Claims, 5 Drawing Sheets

(56) References Cited

U.S. PATENT DOCUMENTS

| | | | | |
|---|---|---|---|---|
| 2007/0121529 | A1* | 5/2007 | Meier | G06F 15/0225 370/256 |
| 2010/0268799 | A1* | 10/2010 | Maestas | H04L 29/12283 709/220 |
| 2013/0103694 | A1 | 4/2013 | Luong et al. | |
| 2013/0201825 | A1* | 8/2013 | Masputra | H04L 47/60 370/230 |
| 2013/0287024 | A1* | 10/2013 | Herberg | H04L 47/323 370/392 |
| 2014/0136762 | A1* | 5/2014 | Li | G06F 12/0246 711/103 |
| 2014/0244779 | A1 | 8/2014 | Roitshtein et al. | |
| 2015/0350087 | A1* | 12/2015 | Hong | H04L 47/125 370/230 |

OTHER PUBLICATIONS

Wikipedia, "Bloom Filter", [online], Aug. 17, 2014, [retrieved on Sep. 2, 2014]. Retrieved from the Internet: <URL: http://en.wikipedia.org/w/index.php?title=Bloom_filter&printable=yes>, pp. 1-16.

"Bloom Filters by Example", [online], [retrieved on Oct. 7, 2014]. Retrieved from the Internet: <URL: http://billmill.org/bloomfilter-tutorial>, pp. 1-4.

Chakrabarti et al., "IPv6 Neighbor Discovery Optimizations for Wired and Wireless Networks", 6man WG, Internet Draft, [online], Jul. 4, 2014, [retrieved on Jul. 10, 2014]. Retrieved from the Internet: <URL: http://tools.ietf.org/pdf/draft-chakrabarti-nordmark-6man-efficient-nd-06.pdf>, pp. 1-34.

Thubert, "6LoWPAN Backbone Router", 6LoWPAN, Internet Draft, [online], Feb. 25, 2013, [retrieved on Jul. 10, 2014]. Retrieved from the Internet: <URL: http://tools.ietf.org/pdf/draft-thubert-6lowpan-backbone-router-03.pdf>, pp. 1-20.

Vyncke, Ed., et al., "Why Network-Layer Multicast is Not Always Efficient at Datalink Layer", Internet Engineering Task Force, Internet Draft, [online], Feb. 14, 2014, [retrieved on Jul. 10, 2014]. Retrieved from the Internet: <URL: http://tools.ietf.org/pdf/draft-vyncke-6man-mcast-not-efficient-01.pdf>, pp. 1-11.

Xu et al., "A General Framework of Source Address Validation and Traceback for IPv4/IPv6 Transition Scenarios", SAVI, Internet Draft, [online], May 4, 2014, [retrieved on Oct. 15, 2014]. Retrieved from the Internet: <URL: http://www.potaroo.net/cgi-bin/id2pdf?f1=draft-xu-savi-transition-05%2etxt>, pp. 1-19.

"IEEE Security+Privacy day 2 report", [online], [retrieved on Jul. 10, 2014]. Retrieved from the Internet: <URL: http://codeverge.com/mozilla.dev.identity/ieee-security+privacy-day-2-report/1990296 >, pp. 1-23.

Broder et al., "Network Applications of Bloom Filters: A Survey", Internet Mathematics vol. 1, No. 4, [online], May 10, 2004, [retrieved on Oct. 9, 2014]. Retrieved from the Internet: <URL: http://www.di.unipi.it/~ricci/im2005b.pdf>, pp. 485-509.

Winter, Ed., et al., "RPL: IPv6 Routing Protocol for Low-Power and Lossy Networks", Internet Engineering Task Force, Request for Comments: 6550, Mar. 2012, pp. 1-157.

Narten et al., "Neighbor Discovery for IP version 6 (IPv6)", Network Working Group, Request for Comments: 4861, Sep. 2007, pp. 1-97.

Thomson et al., "IPv6 Stateless Address Autoconfiguration", Network Working Group, Request for Comments: 4862, Sep. 2007, pp. 1-30.

Shelby, Ed., et al., "Neighbor Discovery Optimization for IPv6 over Low-Power Wireless Personal Area Networks (6LoWPANs)", Internet Engineering Task Force, Request for Comments: 6775, Nov. 2012, pp. 1-55.

Aura, "Cryptographically Generated Addresses (CGA)", Internet Engineering Task Force, Request for Comments: 3972, Mar. 2005, pp. 1-22.

Levy-Abegnoli et al., U.S. Appl. No. 14/516,799, filed Oct. 17, 2014.

\* cited by examiner

DUPLICATE ADDRESS DETECTION BASED ON DISTRIBUTED BLOOM FILTER

TECHNICAL FIELD

The present disclosure generally relates to duplicate address detection by a network device in an Internet Protocol (IP) data network, more particularly to duplicate address detection (DAD) based on a distributed bloom filter.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Existing stateless autoconfiguration techniques enable an IPv6 device (e.g., host device) to create its own autoconfigured IPv6 address in response to a received router advertisement message specifying a link prefix advertised by an advertising router device. The IPv6 device can create the autoconfigured IPv6 address based on concatenating the link prefix with a suffix (e.g., an Extended Unique Identifier (EUI-64) link layer device address, a randomly-generated number, etc.).

The IPv6 device initiates a duplicate address detection (DAD) procedure to determine from another IPv6 device whether the autoconfigured IPv6 address is already in use: the IPv6 device can initiate the DAD procedure based on broadcasting/multicasting a query (e.g., a Neighbor Solicitation message) to all IPv6 devices in the link layer domain; alternately the IPv6 device can send a unicast address registration message to a router and await an acknowledgement from the router that a duplicate address is not detected.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
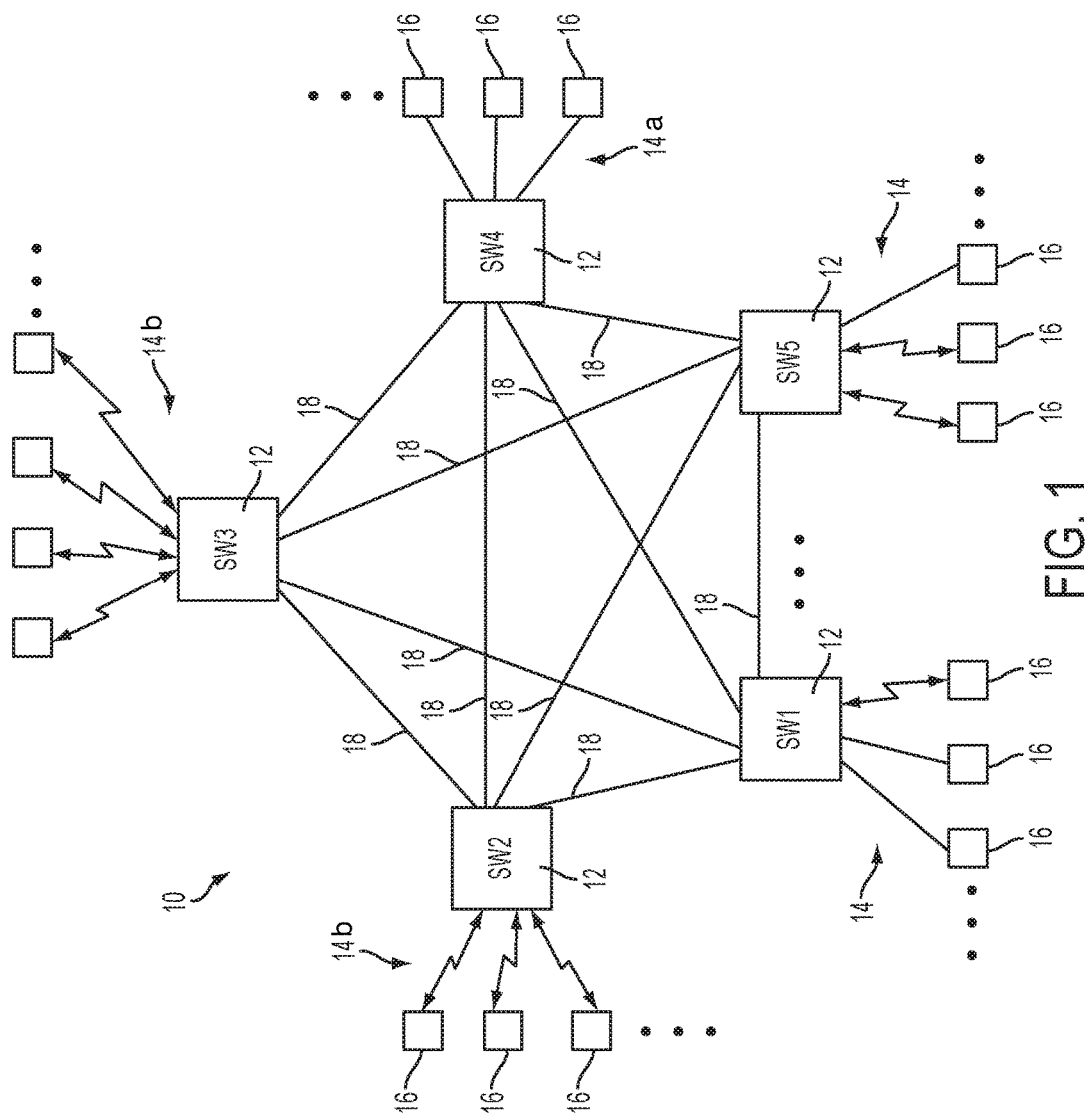
FIG. 1 illustrates an example network having an apparatus for generating a distributed Bloom filter, representing device addresses having attached to the apparatus or another network device in the network, to determine whether a new device address is not a duplicate of the device addresses in the network, according to an example embodiment.

In one embodiment, a method comprises: generating, by a first network device in a network, a Bloom filter bit vector representing device addresses of devices having attached to at least one of the first network device or a second network device in the network; and determining whether a new device address is not a duplicate of any of the device addresses in the network based on the Bloom filter bit vector.

In another embodiment, an apparatus comprises a memory circuit and a processor circuit. The memory circuit is configured for storing a Bloom filter bit vector. The processor circuit is configured for generating the Bloom filter bit vector representing device addresses of devices having attached to at least one of the apparatus or a second network device in a network. The processor circuit further is configured for determining whether a new device address is not a duplicate of any of the device addresses in the network based on the Bloom filter bit vector.

In another embodiment, logic is encoded in one or more non-transitory tangible media for execution by a machine and when executed by the machine operable for: generating, by a first network device in a network, a Bloom filter bit vector representing device addresses of devices having attached to at least one of the first network device or a second network device in the network; and determining whether a new device address is not a duplicate of any of the device addresses in the network based on the Bloom filter bit vector.

DETAILED DESCRIPTION

Particular embodiments provide scalable address autoconfiguration in large-scale networks employing large numbers of host network devices, such as deployment of Internet of Things (IoT) having sensor devices, based on providing distributed Bloom filters between network devices providing network attachments for the host network devices and that minimize the distribution of messages associated with duplicate address detection (DAD). Conventional deployment of DAD in a large IPv6 network can cause a large propagation of multicast traffic throughout the IPv6 network, especially in IoT networks having thousands of sensor nodes or higher. Further, prior neighbor discovery techniques required a network device to defend its IP address, which is not practical in battery-operated, resource-constrained devices such as sensor devices that maintain an idle state (e.g., "sleeping") for extended time periods.

A Bloom filter is a space-efficient probabilistic data structure implemented as a bit array of "m" bits to test whether an element is a member of a set: the test result is that an element is either "possibly in the set," or "definitely not in the set"; hence, a false positive result is possible in a Bloom filter, but a false negative is not possible.

According to an example embodiment, a Bloom filter of device addresses can be used to determine instantaneously whether a new device address of a network device is "definitely not in the set" of existing device addresses in the network, i.e., whether the new device address is not a duplicate of any of the device addresses in the network. A network device such as a switching device or a router device can generate a Bloom filter bit vector of a single device address (i.e., a "device Bloom filter bit vector", or more simply a "device bit vector") based on hashing the single device address with one or more prescribed hash functions: each hash function maps the single device address to one and only one bit that is set within the m-bit array, such that hashing a single device address with "k" distinct hash functions can cause up to "k" distinct bits to be set in the m-bit array (k<m). The m-bit device bit vectors of respective device addresses can be combined (e.g., bitwise OR) to create a distributed Bloom filter of existing device addresses in the network.

Hence, a network device (e.g., a switching device, a router device, etc.) can determine whether a new device address is not a duplicate of any of the existing device addresses based on generating a device Bloom filter bit vector from the new device address using the same one or more prescribed hash functions, and comparing the device Bloom filter bit vector with the Bloom filter bit vector of the existing device addresses generated based on the same one or more prescribed hash functions.

According to an example embodiment, network devices (e.g., switching devices, etc.) can exchange Bloom filter bit vectors generated based on device addresses of network devices having attached to the switching devices. Hence, any one switching device can instantaneously determine whether a new device is not a duplicate of any of the device addresses in the network based on one or more of the Bloom filter bit vectors. The Bloom filter bit vectors generated based on the same hash function(s) can be combined (e.g., using a bitwise-OR operation) into a single network-wide Bloom filter bit vector (i.e., a "network bit vector"), enabling instantaneous determination if the new device address is not a duplicate of any of the device addresses in the network; alternately, each switching device can receive device-specific (e.g., switch-specific) hash functions and respective remote Bloom filter bit vectors, enabling each switching device to compare a new device address to each of the remote Bloom filter bit vectors according to the associated switch-specific hash functions.

Hence, the network devices (e.g., switching devices, etc.) can establish a distributed Bloom filter for duplicate address detection in a scalable manner that minimizes messaging throughout the network, as each switching device can send a unicast address resolution message to an identifiable remote switching device associated with a remote Bloom filter having a conflict with a new device address.

Moreover, the example embodiments eliminate the necessity of a centralized address manager (i.e., repository) to track registered IP addresses, enabling the scalable deployment of duplicate address detection in the switching devices providing a link layer connection to the network devices.

FIG. 1 is a diagram illustrating an example network 10 having one or more network devices (illustrated as switching devices) 12 providing link layer connections 14 for network devices (e.g., host network devices) 16 in the network 10, according to an example embodiment. The network can be implemented as a local area network (LAN) and/or a wide area network (LAN). Each switching device (e.g., SW1, SW2, SW3, SW4, and SW5) 12 can be configured for providing a link layer connection 14 that enables a network device 16 to attach to the corresponding switching device 12 according to a prescribed link layer and/or routing protocol. Each switching device 12 can be implemented as a link layer (Layer 2) access device such as a wired or wireless link layer access device, a link layer switch, a wireless LAN controller, a Source Address Validation Improvement (SAVI) switch, and/or a network layer (Layer 3) router device, etc. Hence, the switching device 12 also can be referred to as a "first-hop" network device or an "access device" providing link layer access to the network 10 for the network devices 10.

Each link layer connection 14 can be a wired link (e.g., Ethernet/IEEE 802 10/100/1000 MB/s) 14a or a wireless link (e.g., WiFi, infrared, Bluetooth, etc.) 14b. Hence each network device 16 can have one or more wired links 14a and/or one or more wireless links 14b with one or more switching devices 12. An example network device can be a sensor device (e.g., an IoT "mote") having a wired or wireless device interface circuit for wired or wireless communications in the network 10.

Each switching device 12 also can have one or more inter-switch links 18 that can connect the switching device 12 to another switching device 12, a router device, a server device, etc., for transport of data packets between the switching devices 12.

As described in further detail below with respect to FIGS. 3A, 3B, and 4, the switching devices 12 can exchange Bloom filter information (e.g., Bloom filter bit vectors, hash function values, etc.), that minimize the necessity of flooding the network with neighbor advertisement messages associated with duplicate address detection. Hence, each switching device 12 can serve as a filter that eliminates multicasting of messages associated with duplicate address detection; to the contrary, messages associated with duplicate address detection can be limited to one or more unicast messages directed to a specific destination switching device 12 for address resolution based on an identified conflict associated with the destination switching device.

Figure 2:
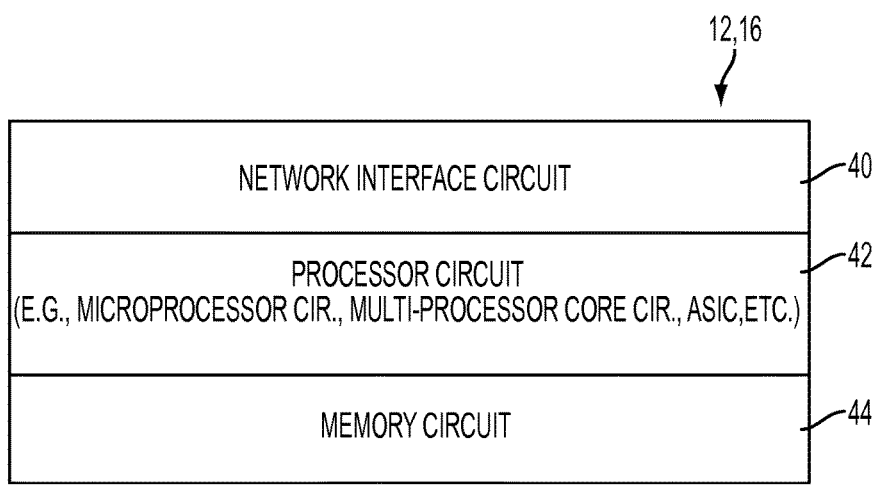
FIG. 2 is a diagram illustrating any one of the devices of FIG. 1, according to an example embodiment.

FIG. 2 illustrates an example implementation of any one of the devices 12 and/or 16, of FIG. 1, according to an example embodiment. Each apparatus 12 and/or 16 is a physical machine (i.e., a hardware device) configured for implementing network communications with other physical machines 12 and/or 16 via the network 10. The term "configured for" or "configured to" as used herein with respect to a specified operation refers to a device and/or machine that is physically constructed and arranged to perform the specified operation. Hence, the apparatus 12 and/or is a network-enabled (user machine providing user access to a network)/machine implementing network communications via the network 10.

Each apparatus 12 and/or 16 can include a device interface circuit 40, a processor circuit 42, and a memory circuit 44. The device interface circuit 40 can include one or more distinct physical layer transceivers for communication with any one of the other devices 12 and/or 16; the device interface circuit 40 also can include an IEEE based Ethernet transceiver for communications with the devices of FIG. 1 via any of the links 14 and/or 18 (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12 and/or 16 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
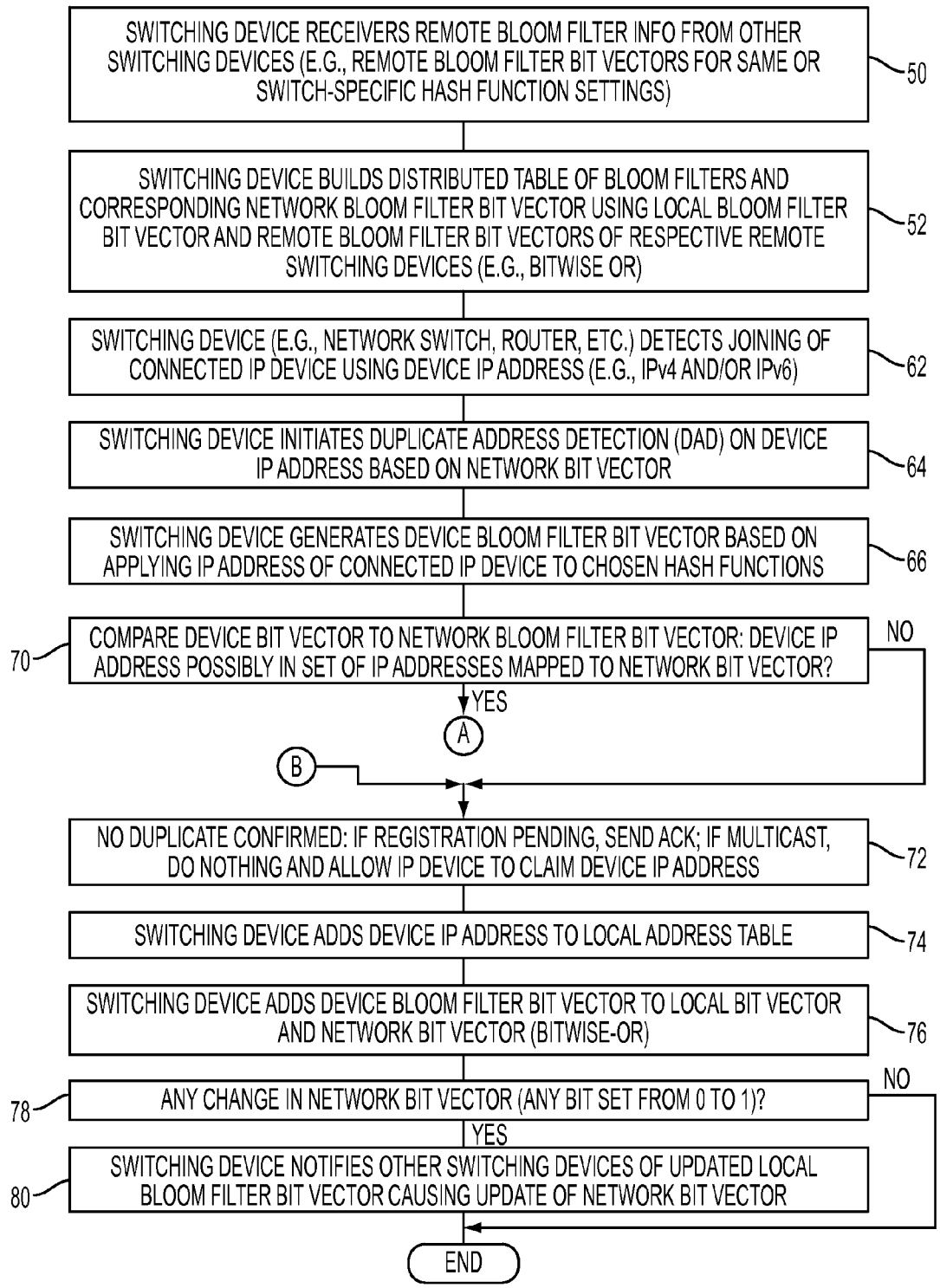
FIGS. 3A and 3B illustrate an example method of generating a distributed Bloom filter to determine whether a new device address is not a duplicate of the device addresses already attached within the network, according to an example embodiment.
Figure 3B:
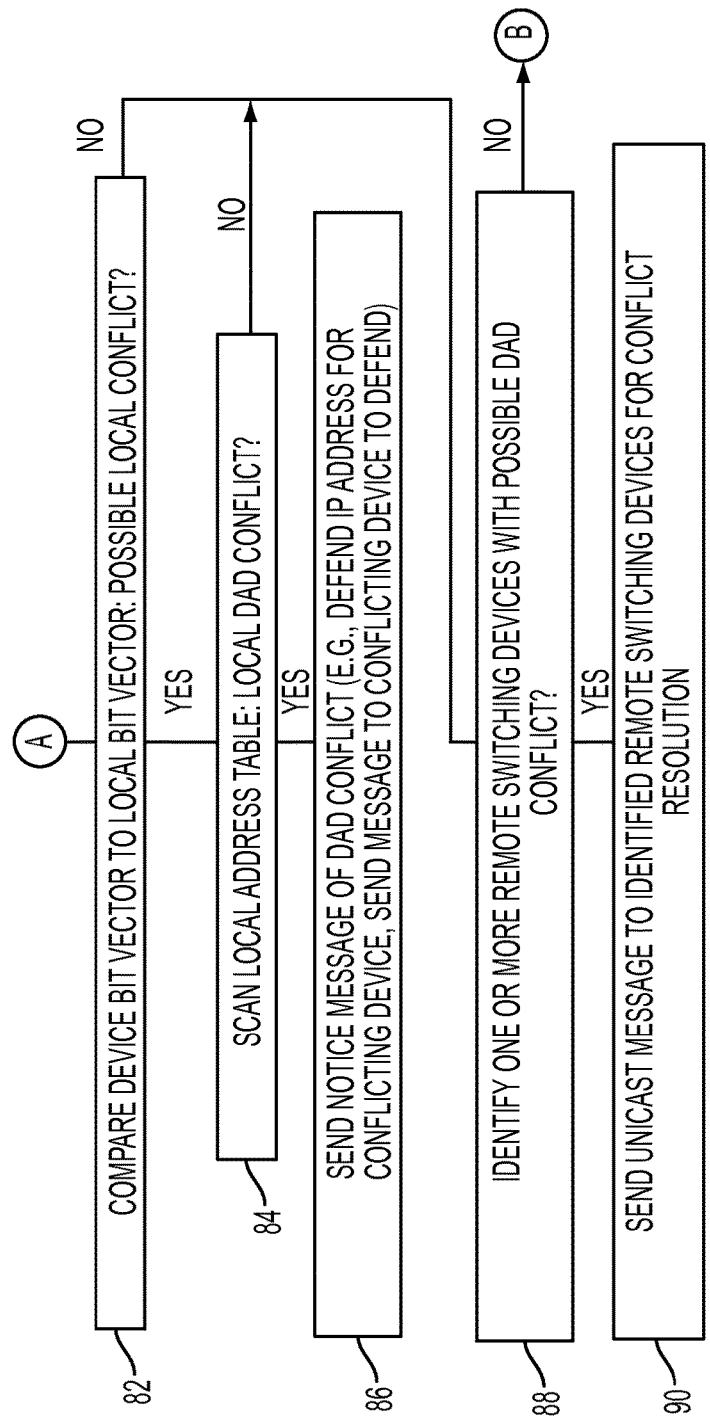

FIGS. 3A and 3B illustrate an example method of generating a distributed Bloom filter to determine whether a new device address is not a duplicate of the device addresses of network devices already attached within the network, according to an example embodiment. FIG. 4 illustrates data structures stored in a memory circuit 44 of a switching device 12, including an example distributed Bloom filter based on a local switch Bloom filter bit vector and remote switch Bloom filter bit vectors, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

The processor circuit 42 of each switching device 12 can output, via its corresponding device interface circuit 40, Bloom filter information stored in its memory circuit 44 to another switching device 12 via one or more inter-switch links 18. Bloom filter information can include, for example, one or more Bloom filter bit vectors such as a device-specific Bloom filter bit vector (46 of FIG. 4), and/or hash function settings 48. In particular, each switching device (e.g., SW1) 12 can store its own locally-specific (e.g., switch-specific) Bloom filter bit vector (e.g., 46a for switching device SW1) representing the device addresses of local network devices 16 having attached to the corresponding switching device (e.g., SW1) 12.

Hence, the device interface circuit 40 of each switching device (e.g., SW1) 12 can receive in operation 50 of FIG. 3A one or more m-bit remote device-specific (e.g., switch-specific) Bloom filter bit vectors (e.g., 46b, 46c, 46d, and/or 46e) from the respective switching devices (e.g., SW2, SW3, SW4, and/or SW5), where each remote Bloom filter bit vector (e.g., 46b, 46c, 46d, and/or 46e) represents the device addresses of remote network devices 16 having attached to the corresponding remote switching device (e.g., SW2, SW3, SW4, and/or SW5). As illustrated in FIG. 4, the processor circuit 42 of the switching device (e.g., SW1) 12 can store the received Bloom filter information in its corresponding memory circuit 44.

The processor circuit 42 of the switching device (e.g., SW1) 12 can form in operation 52 a distributed Bloom filter 54 based on storage of the m-bit local switch Bloom filter bit vector 46a, and the received m-bit remote switch-specific Bloom filter bit vectors 46b, 46c, 46d, and 46e in the memory circuit 44. In one embodiment, if processor circuit 42 determines from the received Bloom filter information that each of the switch-specific bit vectors 46a-46e are generated based on the same hash function parameters 48, the processor circuit 42 can implement the distributed Bloom filter 54 as a single m-bit network Bloom filter bit vector 56 formed by a Bitwise-OR operation. In an alternate embodiment, if the switch-specific Bloom filter bit vectors 46a-46e are generated using different hash function parameters 48, the processor circuit 42 can associate the switch-specific Bloom filter bit vectors 46 with their associated hash function parameters 48 and switch identifier 58, such that the distributed Bloom filter 54 can include the collection of switch-specific Bloom filter bit vectors 46a-46e and the respective hash function parameters 48 of the identified switching devices 12; hence, the processor circuit 42 can compare a new device address 60 with a remote switch-specific Bloom filter bit vector (e.g., 46b) based on applying the corresponding set of hash function parameters 48.

The processor circuit 42 of the switching device 12 can detect in operation 62 of FIG. 3A a new device address 60 of a connected Internet Protocol (IP) device (e.g., IoT mote) 16 joining an attachment link 14 based on detecting, for example, a neighbor advertisement message multicast by the connected network device 16; the processor circuit 42 also can detect the new device address 60 in response to a registration request from the network device 16.

The processor circuit 42 in operation 64 can initiate duplicate address detection for the new device address 60, beginning with generating in operation 66 an m-bit device Bloom filter bit vector (i.e., "device bit vector") 68 based on the hash functions 48 of at least the local switch (e.g., SW1) 12. As illustrated in FIG. 4, the hashing in operation 66 of the new device address 66 using the three hash functions "Hx, Hy, and Hz" results in the m-bit device bit vector 68 having bits set at bit positions 1, 9 and 11 (m=11).

Assuming that all the switch-specific Bloom filter bit vectors 46 are generated based on the same hash function values 48 as described above, the processor circuit 42 of the local switch device (SW1) can compare in operation 70 the device bit vector 68 to the network Bloom filter bit vector 56 to determine if there is no duplicate of any of the device addresses in the network. Specifically, a duplicate may exist only if each of the bit positions set in the device bit vector (DEVICE(0,m)) 68 also are set in the network bit vector (NETWORK(0,m)) 56, i.e., only if the following bitwise AND operation is true:

DEVICE(0,m) AND NETWORK(0,m)=DEVICE(0,m).

Figure 4:
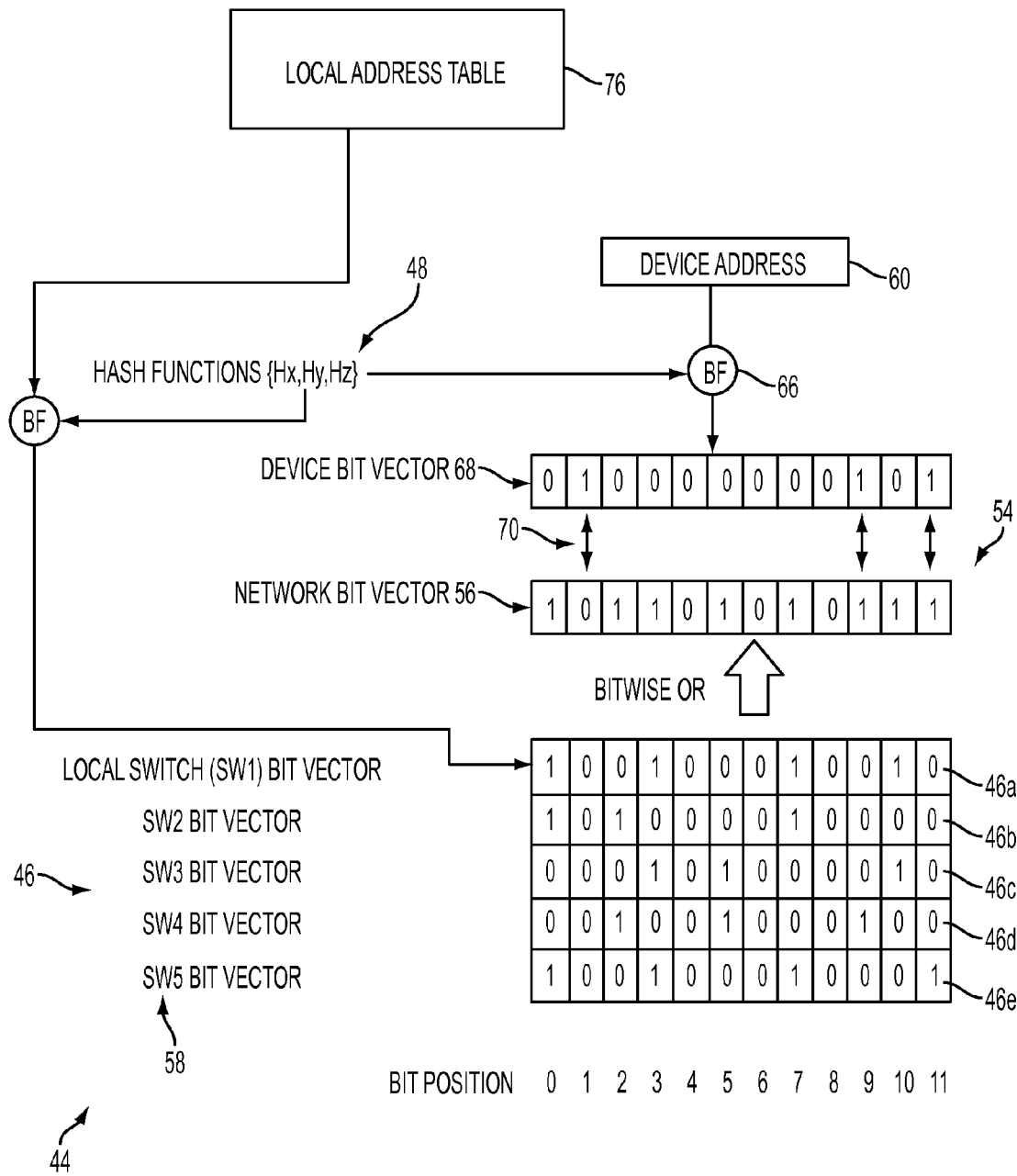
FIG. 4 illustrates an example distributed Bloom filter based on a locally-specific Bloom filter bit vector and remote device-specific Bloom filter bit vectors, according to an example embodiment.

As illustrated in FIG. 4, the device address 60 is not a duplicate of any device address in the network 10 because the bit position 1 of the device bit vector 68 is set to "1" but the corresponding bit position 1 of the network Bloom filter bit vector 56 is set to "0". Hence, if no duplicate of the device bit vector 68 exists in the network bit vector 56, then the device address 60 is not a duplicate of any device address in the network 10 and cannot possibly be in the set of IP addresses mapped to the network bit vector 56.

If in operation 70 there is no possible duplicate of the new device address 60, the corresponding network device 16 is permitted to use the new device address 60: if the network device 16 multicasted a neighbor discovery message advertising the new device address 60 (e.g., according to RFC 4862), the processor circuit 42 in operation 72 can "do nothing" and allow the network device 16 to claim the new device address 60, such that the multicasting is limited to the local link domain of the local switching device "SW1" 12; if the network device 16 sent the new device address 60 as part of an address registration (e.g., according to RFC 6775), the processor circuit 42 in operation 72 can send an acknowledgement that authorizes the network device 16 to use the new device address 60.

The processor circuit 42 of the switching device 12 in operation 74 can add the new device address 60 to the local device address table 76 of the switching device 12. As described below, the local device address table 76 can store the device addresses of network devices 16 having attached to the corresponding local switching device (e.g., SW1) 12 in case address resolution is needed in response to a detected "conflict".

The processor circuit 42 in operation 76 also can add the device Bloom filter bit vector 68 to the local bit vector (e.g., 46a), for example based on executing a bitwise-OR operation; as described previously, if all switch-specific bit vectors 46 are generated based on the same hash function values 48, the network bit vector 56 also can be updated with a bitwise-OR operation of the device bit vector 68 or the updates local switch bit vector 46a.

If the updating of the network bit vector 56 in operation 76 causes in operation 78 any change in the network bit vector 56 (e.g., a bit transitions from "0" to "1"), the processor circuit 42 of the local switching device (SW1) 12 in operation 80 can notify the other switching devices (e.g., SW2, SW3, SW4, and/or SW5) of the updated local Bloom filter bit vector 46a that caused an update in the network bit vector 56.

Hence, the local network switch 12 can instantly determine if the new device address 60 is not a duplicate of any of the device addresses in the network based on the network bit vector 56. If the switch devices 12 use different hash key values 48 for generating their bit vectors 46, the processor circuit 42 of the local network switch 12 can generate multiple device bit vectors 68 using the respective hash key values 48 of the different switching devices to perform a bitwise comparison of the respective switch-specific bit vectors 46.

If in operation 70 the processor circuit 42 determines that all bits set in the device bit vector 68 also are set in the network bit vector 56, the processor circuit 42 can determine a potential conflicting switching device relative to the device address 60. Referring to FIG. 3B, the processor circuit 42 of the local switch device (SW1) 12 can compare in operation 82 the device bit vector 68 to the local switch Bloom filter bit vector 46a: if the processor circuit 42 detects a possible conflict based on the local switch Bloom filter bit vector 46a having the same bits set as in the device bit vector 68, the processor circuit 42 can scan in operation 84 the local address table 76 for a duplicate address (e.g., a duplicate IPv6 address). If the processor circuit 42 in operation 84 detects a local DAD conflict, the processor circuit 42 in operation 86 can cause a notification of the DAD conflict to be sent to the network device 16 attempting use of the new device address 60; for example, the processor circuit 42 can send a message to another locally-connected network device 16 already claiming use of the device address of the need to defend its device address; alternately, the local switch device (SW1) 12 can act as a proxy and defend use of the network address on behalf of the other locally-connected network device already claiming use of the device address, for example if the other network device may be in an idle state (e.g., "asleep").

If in operation 82 or 84 the processor circuit 42 of the local switching device 12 determines there is no conflict in the local switch bit vector 46a or the local address table 76, the processor circuit 42 can identify in operation 88 if one or more of the identifiable switching devices 12 has a possible DAD conflict based on comparing the device bit vector 68 (generated using the appropriate hash value keys) to each of the remote bit vectors 46b, 46c, 46d, and/or 46e. If no conflict is detected in operation 88, then the processor circuit 42 of the local switching device (SW1) 12 can conclude that no conflict exists, as the apparent conflict in operation 70 could have been due to the aggregation of bits between different switch-specific bit vectors, at which point the new device address 60 can be implemented as described above with respect to operations 72 through 80.

A set bit can never be removed from a Bloom filter. Hence, the processor circuit 42 of any one switching device 12 can determine after long-term usage that the distributed Bloom filter 54 is reaching "capacity", e.g., sixty to seventy percent (60-70%) of the bits are set in the m-bit Bloom filter 54. Hence, the switching devices 12 can send messages to each other that the distributed Bloom filter 54 needs to be reset, requiring address recalculation throughout the network 10.

If in operation 88 a conflict is identified with one of the remote bit vectors 46b, 46c, 46d, and/or 46e, the processor circuit 42 can output a unicast message in operation 90 that specifies the device address 60 to the corresponding one or more destination switching devices 12, enabling the destination switching device 12 to execute conflict resolution, for example based on comparing the device address to the corresponding local address table 76. The destination switching device 12 can respond, as needed, depending on the protocol and based on whether a duplicate address is detected.

Additional data structures can be added to the memory circuit 44 to improve searching performance in FIG. 3B; for example, the distributed Bloom filter 54 can be implemented as a tree structure, where the network bit vector 56 is the root of a tree structure, each switch-specific bit vector 46 is a leaf of the tree, and intermediate nodes between the root and the leaves can contain an aggregation of the switch-specific bit vectors 46, for example aggregating the switching devices 12 according to a prescribed network topology.

According to example embodiments, a distributed Bloom filter can be established based on device-specific Bloom filter bit vectors from respective network devices. The example embodiments can greatly reduce the transmission of messages associated with DAD throughout a data network. Moreover, a local network device can instantly determine whether a new device address is not a duplicate of any other device address in the data network, providing a dramatic improvement in operations requiring a registration of a device address.

Although the example embodiments described a distributed Bloom filter for DAD with respect to a network address (e.g., an Internet Protocol address), the example embodiments can be applied to other types device addresses, for example a link layer (Media Access Control (MAC) address, etc.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   generating, by a first network device in a network, a Bloom filter bit vector representing device addresses of devices having attached to at least one of the first network device or a second network device in the network;
   determining whether a new device address is not a duplicate of any of the device addresses in the network based on the Bloom filter bit vector; and
   receiving, by the first network device, a remote Bloom filter bit vector from the second network device, the remote Bloom filter bit vector representing the device addresses of remote devices having attached to the second network device;
   the generating including generating a local Bloom filter bit vector based on the device addresses of the devices having attached to the first network device, the Bloom filter bit vector generated based on the local Bloom filter bit vector and the remote Bloom filter bit vector.

2. The method of claim 1, wherein the determining includes:
   identifying the new device address as conflicting with at least one of the local Bloom filter bit vector or the remote Bloom filter bit vector; and
   determining whether the new device address is a duplicate based on causing resolution of the new device address relative to an address table associated with the conflicted one Bloom filter bit vector.

3. The method of claim 2, wherein the causing resolution includes the first network device sending a unicast message to the second network device for resolution of the new device address relative to the address table maintained by the second network device for the remote Bloom filter bit vector.

4. The method of claim 1, wherein the determining includes confirming the new device address is not a duplicate based on:
   generating a device Bloom filter bit vector from the new device address; and
   determining the device Bloom filter bit vector does not conflict with the Bloom filter bit vector.

5. The method of claim 1, wherein if the new device address is not a duplicate of any of the device addresses in the network, the method further includes:
   updating the Bloom filter bit vector based on the new device address; and
   if the new device address was advertised in a registration request by an identifiable device in the network, sending a registration acknowledgement of the new device address to the identifiable device; or
   if the new device address was advertised in a multicast message by the identifiable device, allowing the identifiable device to claim the new device address.

6. The method of claim 1, further comprising:
   receiving remote Bloom filter bit vectors from respective remote network devices in the network, including the second network device;
   generating a local Bloom filter bit vector based on the device addresses of the devices having attached to the first network device, the local Bloom filter bit vector and the remote Bloom filter bit vectors forming the Bloom filter bit vector as a distributed Bloom filter.

7. The method of claim 6, wherein:
   the determining includes identifying the new device address conflicting with an identified one of the remote Bloom filter bit vectors;
   the method further comprising sending a unicast message to the remote network device associated with the identified one remote Bloom filter bit vector.

8. The method of claim 1, wherein:
   the Bloom filter bit vector is generated based on the first network device applying one or more locally-specific hash functions on the device addresses of the devices having attached to the first network device;
   the method further comprising receiving, by the first network device from the second network device, a remote Bloom filter bit vector and one or more remote device-specific hash functions used by the second network device to generate the remote Bloom filter bit vector;
   the determining whether the new device address is not a duplicate is based on determining whether the new device address conflicts with the Bloom filter bit vector relative to the one or more locally-specific hash functions, and determining whether the new device address conflicts with the remote Bloom filter bit vector relative to the one or more remote device-specific hash functions.

9. An apparatus comprising:
   a memory circuit configured for storing a Bloom filter bit vector;
   a processor circuit configured for generating the Bloom filter bit vector representing device addresses of devices having attached to at least one of the apparatus or a second network device in a network, the processor circuit further configured for determining whether a new device address is not a duplicate of any of the device addresses in the network based on the Bloom filter bit vector; and
   a device interface circuit configured for receiving a remote Bloom filter bit vector from the second network device, the remote Bloom filter bit vector representing the device addresses of remote devices having attached to the second network device;

the processor circuit configured for generating a local Bloom filter bit vector based on the device addresses of the devices having attached to the apparatus, the Bloom filter bit vector generated based on the local Bloom filter bit vector and the remote Bloom filter bit vector.

10. The apparatus of claim 9, wherein the processor circuit is configured for:

identifying the new device address as conflicting with at least one of the local Bloom filter bit vector or the remote Bloom filter bit vector; and determining whether the new device address is a duplicate based on causing resolution of the new device address relative to an address table associated with the conflicted one Bloom filter bit vector.

11. The apparatus of claim 10, wherein the processor circuit is configured for sending a unicast message to the second network device for resolution of the new device address relative to the address table maintained by the second network device for the remote Bloom filter bit vector.

12. The apparatus of claim 9, wherein the processor circuit is configured for confirming the new device address is not a duplicate based on:

generating a device Bloom filter bit vector from the new device address; and determining the device Bloom filter bit vector does not conflict with the Bloom filter bit vector.

13. The apparatus of claim 9, wherein the processor circuit is configured for:

updating the Bloom filter bit vector based on the new device address if the new device address is not a duplicate of any of the device addresses in the network; and if the new device address is not a duplicate of any of the device addresses in the network and if the new device address was advertised in a registration request by an identifiable device in the network, sending a registration acknowledgement of the new device address to the identifiable device; or if the new device address is not a duplicate of any of the device addresses in the network and if the new device address was advertised in a multicast message by the identifiable device, allowing the identifiable device to claim the new device address.

14. The apparatus of claim 9, further comprising:

a device interface circuit configured for receiving remote Bloom filter bit vectors from respective remote network devices in the network, including the second network device;

the processor circuit configured for generating a local Bloom filter bit vector based on the device addresses of the devices having attached to the apparatus, the local Bloom filter bit vector and the remote Bloom filter bit vectors forming the Bloom filter bit vector as a distributed Bloom filter.

15. The apparatus of claim 14, wherein the processor circuit is further configured for:

identifying the new device address as conflicting with an identified one of the remote Bloom filter bit vectors;

sending a unicast message to the remote network device associated with the identified one remote Bloom filter bit vector.

16. The apparatus of claim 9, wherein the processor circuit is configured for:

generating the Bloom filter bit vector based on applying one or more locally-specific hash functions on the device addresses of the devices having attached to the apparatus;

receiving, from the second network device, a remote Bloom filter bit vector and one or more remote device-specific hash functions used by the second network device to generate the remote Bloom filter bit vector;

determining whether the new device address conflicts with the Bloom filter bit vector relative to the one or more locally-specific hash functions, and determining whether the new device address conflicts with the remote Bloom filter bit vector relative to the one or more remote device-specific hash functions.

17. Logic encoded in one or more non-transitory tangible media for execution by a machine and when executed by the machine operable for:

generating, by a first network device in a network, a Bloom filter bit vector representing device addresses of devices having attached to at least one of the first network device or a second network device in the network;

determining whether a new device address is not a duplicate of any of the device addresses in the network based on the Bloom filter bit vector; and receiving, by the first network device, a remote Bloom filter bit vector from the second network device, the remote Bloom filter bit vector representing the device addresses of remote devices having attached to the second network device;

the generating including generating a local Bloom filter bit vector based on the device addresses of the devices having attached to the first network device, the Bloom filter bit vector generated based on the local Bloom filter bit vector and the remote Bloom filter bit vector.

18. The logic of claim 17, wherein the determining includes confirming the new device address is not a duplicate based on:

generating a device Bloom filter bit vector from the new device address; and determining the device Bloom filter bit vector does not conflict with the Bloom filter bit vector.

19. The logic of claim 17, wherein if the new device address is not a duplicate of any of the device addresses in the network, the logic is further operable for:

updating the Bloom filter bit vector based on the new device address; and if the new device address was advertised in a registration request by an identifiable device in the network, sending a registration acknowledgement of the new device address to the identifiable device; or if the new device address was advertised in a multicast message by the identifiable device, allowing the identifiable device to claim the new device address.

20. The logic of claim 17, further operable for:

receiving remote Bloom filter bit vectors from respective remote network devices in the network, including the second network device;

generating a local Bloom filter bit vector based on the device addresses of the devices having attached to the first network device, the local Bloom filter bit vector and the remote Bloom filter bit vectors forming the Bloom filter bit vector as a distributed Bloom filter.

21. The logic of claim 17, wherein:

the Bloom filter bit vector is generated based on the first network device applying one or more locally-specific hash functions on the device addresses of the devices having attached to the first network device;

the logic further operable for receiving, by the first network device from the second network device, a remote Bloom filter bit vector and one or more remote device-specific hash functions used by the second network device to generate the remote Bloom filter bit vector;

the determining whether the new device address is not a duplicate is based on determining whether the new device address conflicts with the Bloom filter bit vector relative to the one or more locally-specific hash functions, and determining whether the new device address conflicts with the remote Bloom filter bit vector relative to the one or more remote device-specific hash functions.

* * * * *